(No Model.) 5 Sheets—Sheet 1.
C. A. JOHNSON.
BARREL WASHER.

No. 572,116. Patented Dec. 1, 1896.

WITNESSES: INVENTOR:
CHARLES A. JOHNSON.
BY
Fred C. Fraentzel,
ATTORNEY

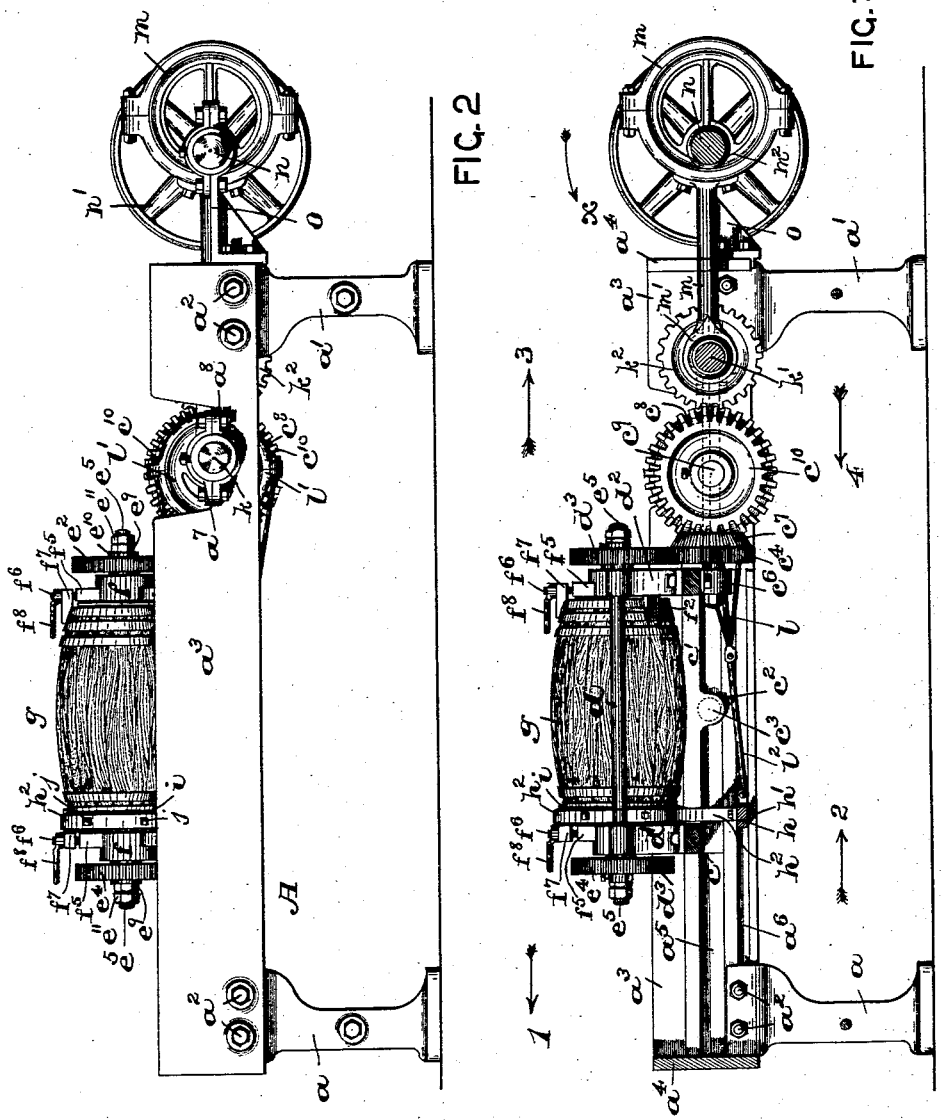

(No Model.) 5 Sheets—Sheet 3.
C. A. JOHNSON.
BARREL WASHER.
No. 572,116. Patented Dec. 1, 1896.
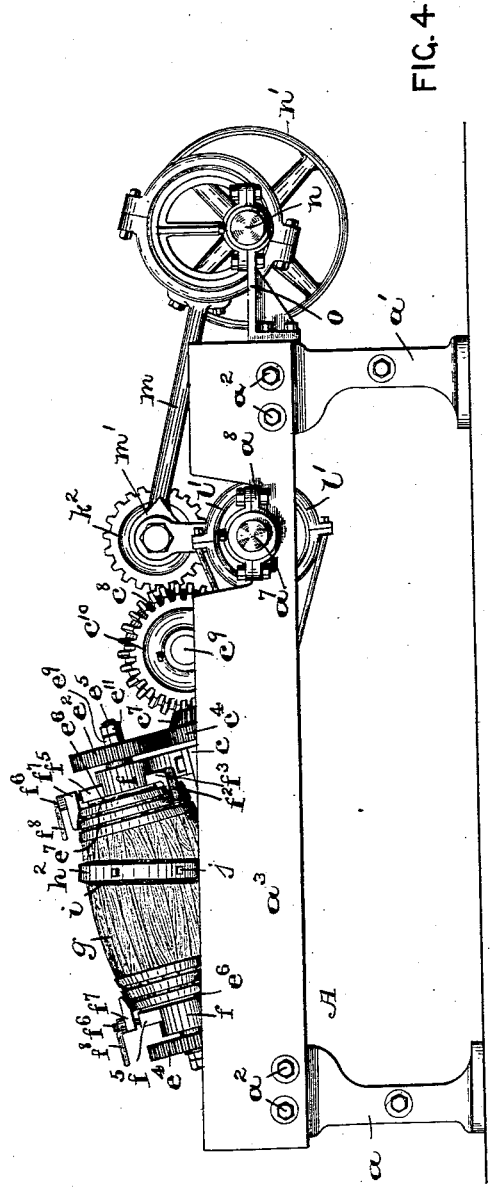
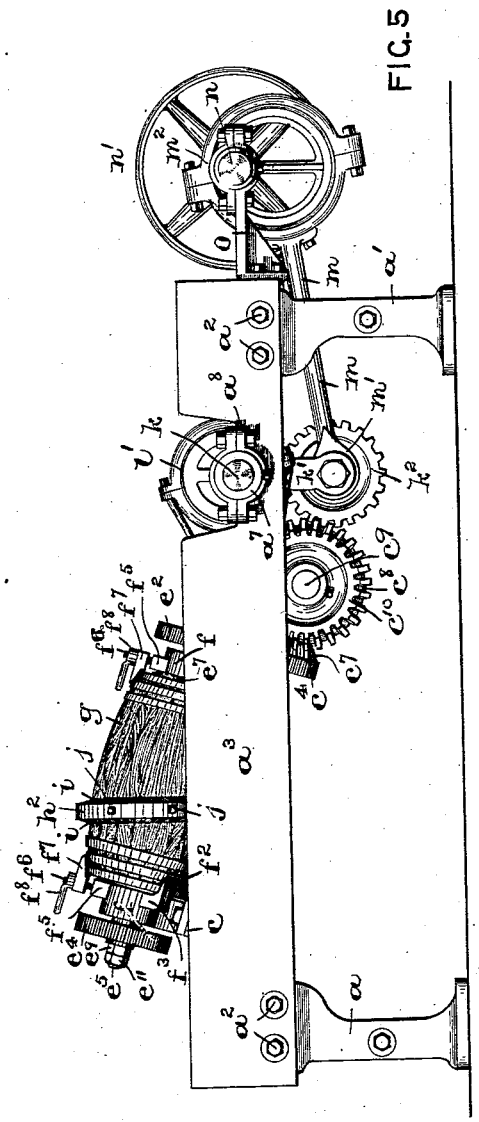
WITNESSES:
INVENTOR:
CHARLES A. JOHNSON.
BY
Fred C. Fraentzel,
ATTORNEY (No Model.) 5 Sheets—Sheet 4.

C. A. JOHNSON.
BARREL WASHER.

No. 572,116. Patented Dec. 1, 1896.

WITNESSES:
Marcy J. Trusdell
Wm. H. Camfield, Jr.

INVENTOR:
CHARLES A. JOHNSON.
BY
Fred C. Fraentzel
ATTORNEY (No Model.)
C. A. JOHNSON.
BARREL WASHER.
No. 572,116.  Patented Dec. 1, 1896.
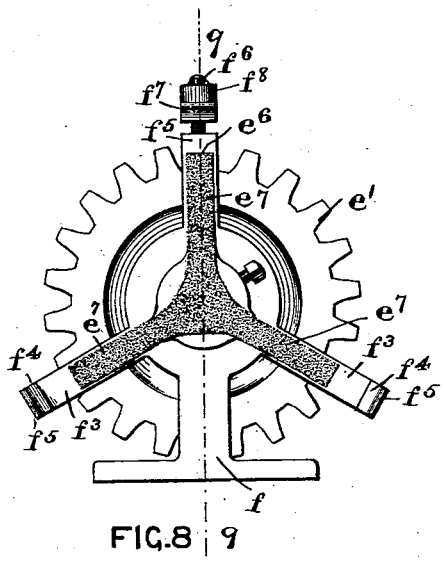
FIG. 8
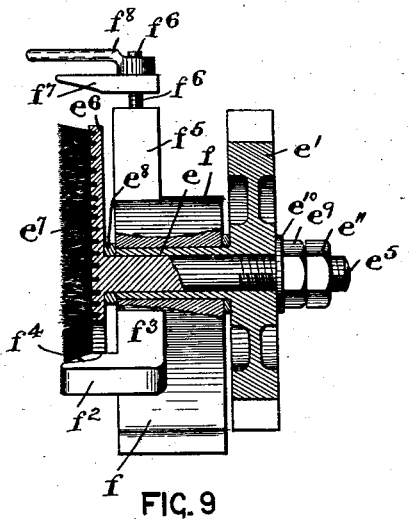
FIG. 9
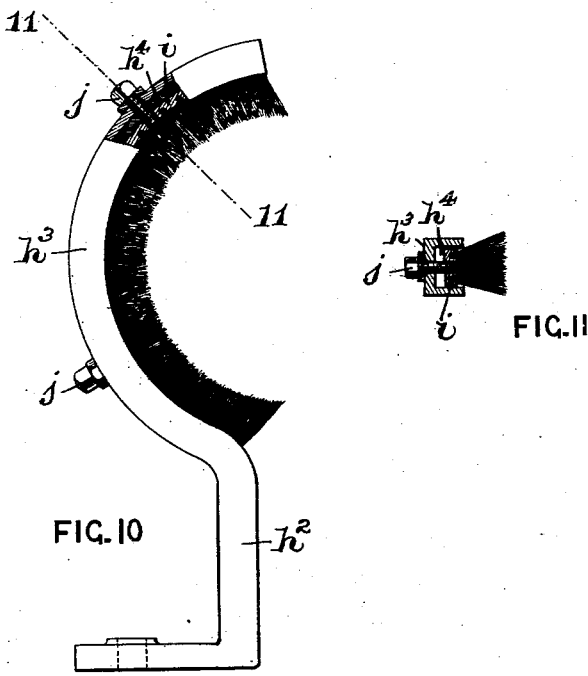
FIG. 10
FIG. 11
WITNESSES:
INVENTOR:
CHARLES A. JOHNSON.
BY
Fred C. Fraentzel,
ATTORNEY

United States Patent Office.

CHARLES A. JOHNSON, OF NEW YORK, N. Y., ASSIGNOR TO THEODORE W. MYERS, OF SAME PLACE.

BARREL-WASHER.

SPECIFICATION forming part of Letters Patent No. 572,116, dated December 1, 1896.

Application filed September 13, 1895. Renewed September 18, 1896. Serial No. 606,295. (No model.)

*To all whom it may concern:*

Be it known that I, CHARLES A. JOHNSON, a citizen of the United States, residing at New York, in the county of New York and State of New York, have invented certain new and useful Improvements in Barrel-Washing Machines; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to improvements in barrel-washing machines, and has for its main object to provide a combined barrel washing or scrubbing and rinsing machine the parts of which are most efficient when in use for the purposes stated, being also very simple in construction.

The invention therefore consists, broadly, in the devices to be hereinafter fully set forth for producing a reciprocatory and at the same time a rocking or an oscillatory motion of the barrel or barrels in the frame or carriage of the machine in the manner of washing or rinsing barrels or kegs by hand.

The invention consists, furthermore, in the construction and combination of parts for the production of an operative machine of the class herein set forth and in the combination of mechanism, such as will be hereinafter fully set forth and finally embodied in the clauses of the claim.

The present contrivances have been particularly designed, first, for producing a shaking as well as a reciprocatory motion of the barrel or keg in the manner of hand-washing, and, secondly, for scrubbing the entire outer surface as well as the ends or heads of the kegs or barrels by means of brushes and means for operating the same.

The invention is fully illustrated in the accompanying sheets of drawings, in which—

Figure 1:
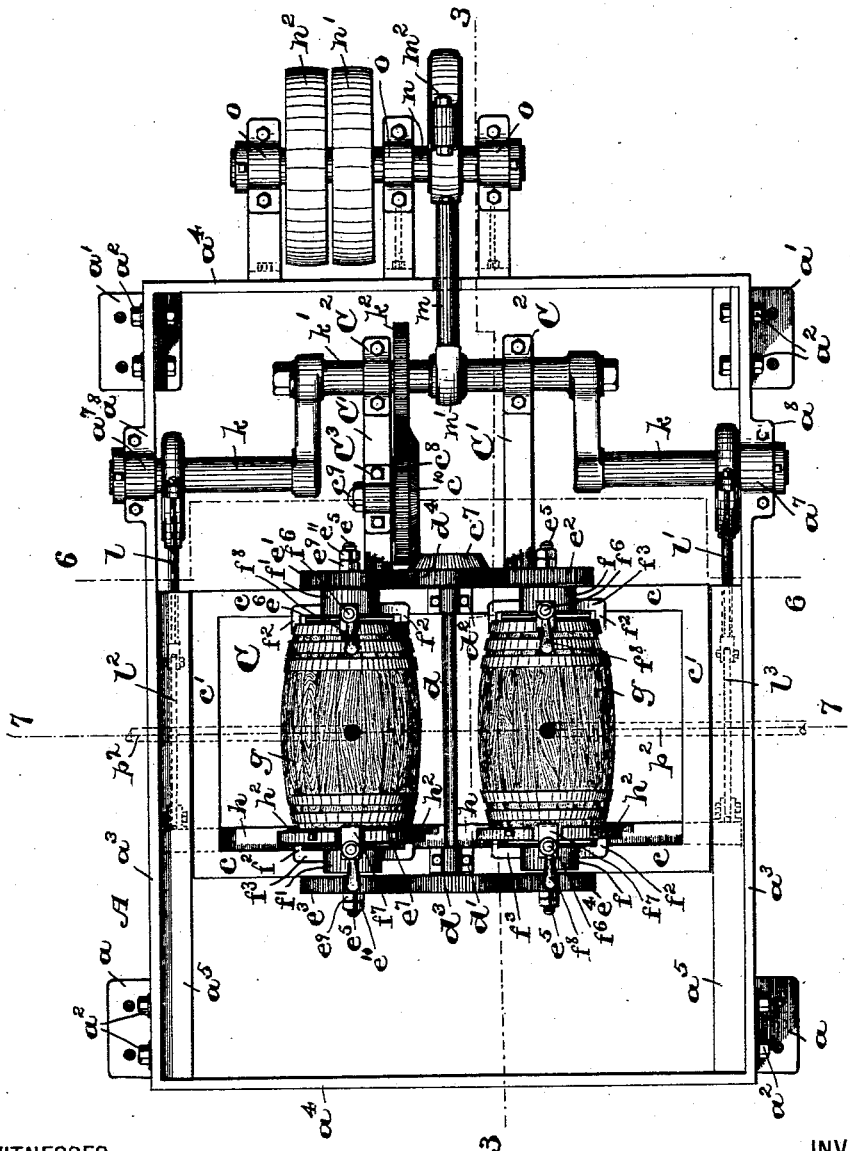
Figure 6:
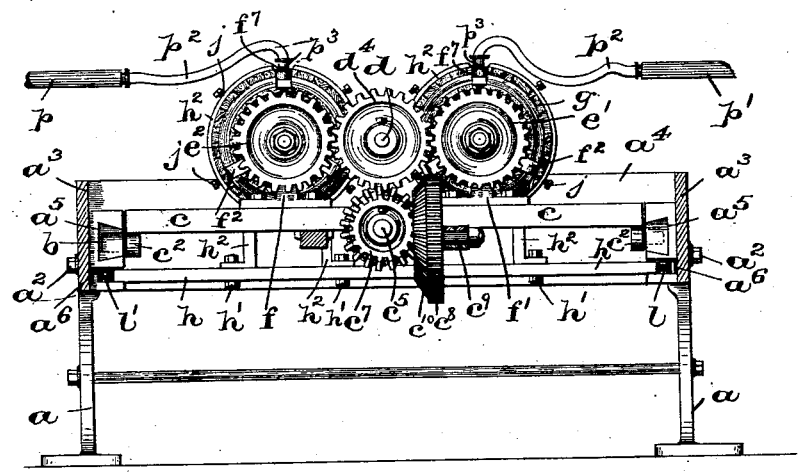
Figure 7:
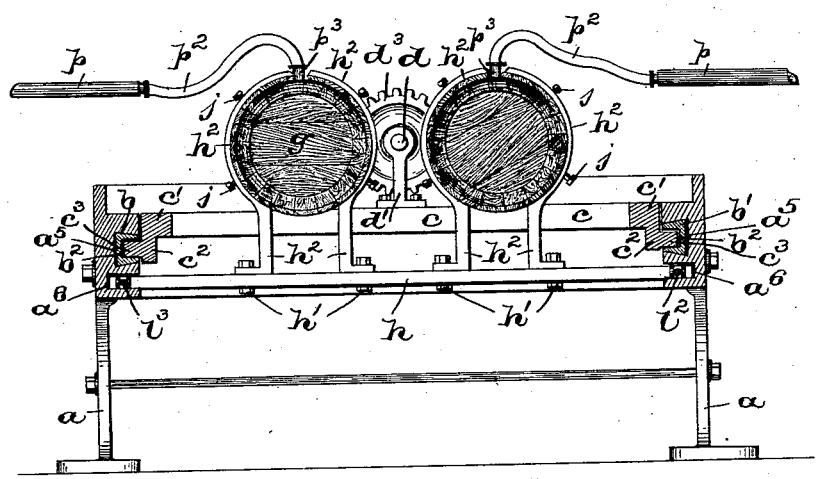

Figure 1 is a plan or top view of a machine embodying the principles of my invention. Fig. 2 is a side elevation of the same with the parts in their operated positions at the end of each stroke of the operating mechanism. Fig. 3 is a longitudinal vertical section of the machine with the parts in the same positions, said section being taken on line 3 3 in Fig. 1. Figs. 4 and 5 are side views of the machine, illustrating the positions of the barrel or keg at the ends of each half-stroke of the operating mechanism, said views clearly representing the rinsing operation of the machine. Fig. 6 is a cross-section taken on line 6 6 in Fig. 1, and Fig. 7 is a similar section taken on line 7 7 in said Fig. 1. Fig. 8 is a detail view illustrating an end elevation of one of the rotary brushes for scrubbing the ends or heads of the barrels or kegs; and Fig. 9 is a vertical section of the same, taken on line 9 9 in said Fig. 8. Fig. 10 is a side view of one of the brush-supports and the brush-sections thereon for scrubbing the sides of the barrels or kegs; and Fig. 11 is a cross-section of the same, taken on line 11 11 in Fig. 10.

Similar letters of reference are employed in all of the above-described views to indicate corresponding parts.

All the operating devices are mounted upon the main frame A of the machine, which is of a suitable height and is properly braced to receive the barrel or keg supporting mechanism or carriage as well as the means for operating the same. The frame and the barrel or keg supporting mechanism may be of a suitable width to carry one barrel or keg or two or more of them side by side, as will be evident from the present construction of the machine, and the frame and said mechanism may be made of different lengths to carry two or more barrels or kegs arranged longitudinally in the frame of the machine, as will be evident.

The main frame of the machine consists, essentially, of suitable standards $a$ and $a'$, secured by means of bolts $a^2$ or in any other well-known manner to the longest sides $a^3$, near the ends $a^4$ of the machine. The inner surfaces of the two long sides $a^3$ are provided with suitable ways or guides $a^5$ of any desirable cross-section, as illustrated in Figs. 6 and 7, and in which are adapted to reciprocate certain sliding pieces $b$ and $b'$, each being provided with a receiving-socket $b^2$, substantially as shown.

C indicates the barrel or keg supporting frame or carriage, and it consists, essentially, of the cross-pieces $c$ and the sides $c'$, substantially as shown in Figs. 1, 3, 6, and 7. Said sides $c'$ are provided on their under surfaces with centrally-arranged and downwardly-extending portions $c^2$, from which project in opposite directions suitable pins or pintles $c^3$, forming pivots for the said frame C. Said pins or pintles $c^3$ are pivotally arranged in the sockets $b^2$ of the slides $b$ and $b'$, as clearly illustrated in Fig. 7. On the cross-pieces $c$ of said frame C, I have secured the two central bearings $d'$ and $d^2$, in which is rotatively arranged a shaft $d$, and upon the free ends of which are secured the gear-wheels $d^3$ and $d^4$, as will be evident from an inspection of Fig. 1. One of said gear-wheels, as $d^4$, on the forward end of said shaft $d$ is in operative engagement with a toothed wheel $c^4$, having its axle $c^5$ rotatively arranged in a bearing $c^6$ on the under side of the frame C, substantially as represented in Fig. 3. Said toothed wheel $c^4$ is also provided with the miter-teeth $c^7$, the purpose of which will be more fully described hereinafter. On the opposite sides of the said bearings $d'$ and $d^2$, but also secured to the cross-pieces $c$ of the frame C, are the bearings $f$ and $f'$. (See Figs. 2, 3, 4, and 5, and more especially Figs. 8 and 9.) Each of said bearings is provided with the inwardly-extending fingers or supporting-lugs $f^2$ on the parts $f^3$ of said bearings, said finger or lugs being suitably curved, as at $f^4$, for the reception of the ends of the barrel or keg $g$ to be supported thereon, as clearly shown in the several figures of the drawings. In the upper part of an upwardly-extending portion or post $f^5$ on each bearing $f$ and $f'$ is a screw-threaded pin $f^6$, on which is pivotally arranged a finger or lug $f^7$, which can be turned to one side to permit the placing of the barrel or keg upon the fingers or lugs $f^2$, and when the said fingers $f^7$ are turned into holding position over the upper edge of the barrel or keg said fingers $f^7$ can be firmly secured down by means of the screw-threaded clamping-levers $f^8$ on said pins $f^6$, as will be clearly understood from an inspection of Figs. 2 to 5, inclusive.

As will be seen from Fig. 9, I have arranged in the bearing portions of the bearings $f$ and $f'$ the tubular hubs $e$ of a pair of gear-wheels $e'$ and $e^2$ in operative mesh with the gear-wheel $d'$ and of a pair of gear-wheels $e^3$ and $e^4$ in operative mesh with the gear-wheel $d^2$. In each tubular hub of said gear-wheels $e'$, $e^2$, $e^3$, and $e^4$ is a suitable spindle $e^5$, provided at one end with any suitable number of radial arms $e^6$, provided with the brushes $e^7$, which are in normal and rotative contact with the ends or heads of the barrels or kegs $g$. Said arms $e^6$ are firmly forced against a collar $e^8$ on the spindle, and the said spindle in each hub $e$ and the brush-arms on said spindles are firmly secured to their respective gear-wheels $e'$, $e^2$, $e^3$, and $e^4$ to rotate the same by a nut $e^9$ and washer $e^{10}$ on the screw-threaded end of each spindle, a lock-nut $e^{11}$ being used to prevent the nut $e^9$ from shaking loose during the working operation of the machine. From the construction illustrated in Fig. 9 it will be seen that as the bristles of the brushes $e^7$ become shorter, due to wear, the spindles can be removed from their respective hubs $e$, and by placing an additional collar or washer on the spindle directly behind the collar $e^8$ the bristles are brought forward and will once more be in operative scrubbing contact with the ends or heads of the keg or barrel, as will be clearly evident, but any other means for adjusting the brushes may be employed. As will be seen from Figs. 3, 6, and 7, the inner surfaces of the long sides $a^3$ of the main frame of the machine are provided with longitudinal grooves $a^6$, into which extend the free ends of a reciprocating bar or cross-piece $h$. Secured to said bar $h$ by means of bolts $h'$ or in any other suitable manner are suitable standards $h^2$, which are curved, as at $h^3$, in conformity with the curved surface of a barrel or keg. Said curved portions $h^3$ of the said standards are preferably made ⊔-shaped in cross-section, as at $h^4$, (see Fig. 11,) and in said portions $h^4$ are arranged any desirable number of brush-sections $i$, having the bristles $i$. Said brush-sections are operatively held in said ⊔-shaped portions $h^4$ of the standards $h^2$ by suitable bolts $j$, which work in screw-threaded holes in said curved parts $h^3$ of the standards to permit the adjustment of the brush-sections $i$ toward the curved surfaces of the barrels or kegs as the bristles wear away.

The bar or cross-piece $h$ receives its reciprocatory movement in the grooves $a^6$ of the main frame A by being connected to a crank-shaft $k$ by eccentrics $l$ and $l'$ and link connections $l^2$ and $l^3$, as clearly shown in Figs. 1 and 3. Said crank-shaft $k$ is rotatively arranged in suitable bearings $a^7$, secured to flanges $a^8$ on the sides $a^3$ of the main frame, substantially in the manner as clearly illustrated in Figs. 1, 2, 4, and 5, but any other suitable arrangement may answer the same purpose.

Extending backward from the barrel or keg supporting frame or carriage C is an arm C', having a suitable bearing C², by means of which it is operatively connected with the crank-pin $k'$ of the shaft $k$. Thus it will be seen that when the crank-shaft $k$ is operated by means of an eccentric $m$, connected at $m'$ to the said crank-pin $k'$ and at $m^2$ to the main driving-shaft $n$, arranged in the bearings $o$, secured to one end piece of the main frame A, said frame C, and hence the barrels or kegs held by the fingers or lugs $f^2$ and $f^7$, will receive a reciprocatory and at the same time an oscillatory movement in the manner of a person shaking a barrel while rinsing the same.

Securely fastened to the crank-pin $k$ is a gear-wheel $k^2$, which meshes with a gear-wheel $c^8$, arranged on a spindle $c^9$, which is rotatively arranged in a bearing C³ on the arm C'. Said gear-wheel $c^8$ is provided with miter-teeth $c^{10}$ on its one side, and these are in operative mesh with the miter-teeth $c^7$ on the toothed wheel $c^4$. Thus it will be seen that when the crank-shaft $k$ rotates the gear-wheel $k^2$ thereon will cause the rotation of the wheel $c^8$, while the miter-teeth thereon operate the gear-wheel $c^4$. Said wheel $c^4$ causes the rotation of the gear-wheels $d^4$ and $d^3$ on the shaft $d$, and said last-mentioned gear-wheels will operate the gear-wheels $e'$, $e^2$, $e^3$, and $e^4$, and hence cause the rotation of the brushes $e^7$ against and over the entire surface of the heads or ends of the kegs or barrels to thoroughly scrub and clean the same. During these operations, and while the barrels or kegs are being tilted in the manner stated, the brush-sections $i$ are caused to slide in a longitudinal direction over the outer and curved surfaces of the kegs or barrels, as will be clearly evident from the above description. The shaft $n$ has a fast pulley $n'$ and a loose pulley $n^2$ thereon, over which may be passed a suitable belt for operating the mechanism of the machine.

The water for rinsing the kegs or barrels is admitted into the bung-holes of the kegs or barrels from the pipes $p$ and $p'$, which have the flexible tubing $p^2$ and suitable nozzles $p^3$ to fit into said bung-holes, as clearly represented in Figs. 6 and 7, said flexible tubes allowing of the reciprocatory and oscillatory movements of the barrels and still permitting the fresh supply of water into the same during the rinsing operation.

From an inspection of Figs. 2, 3, 4, and 5 it will be seen that during the forward stroke of the eccentric $m$ in the direction of arrow $x$ in Fig. 3 the barrel or keg supporting carriage moves in the direction of arrow 1, while the eccentrics $l$ and $l'$ will cause the cross-bar $h$, and hence the brushes thereon, to move in the direction of arrow 2, as indicated in said Fig. 3, whereby the brush-holders $h^2$ and their brush-sections are brought from the positions indicated in Figs. 2 and 3 to the positions shown in Fig. 4, thereby having fully scrubbed or cleaned one half of the outer surface of the barrel or keg. Just previous to the return stroke of the eccentrics $l$ and $l'$ the carriage will again have resumed its practically horizontal position, (indicated in Figs. 2 and 3,) and upon the return stroke of the eccentrics the carriage moves in the direction of arrow 3 and the brush-holders $h^2$ and brush-sections $i$ in the direction of arrow 4, thereby causing the parts to assume the positions indicated in Fig. 5, whereby the brushes have been caused to thoroughly scrub and clean the remaining half of the outer curved surface of the barrel or keg.

From the above description it will be evident that I have devised a machine which is simple and operative in its construction and in which one or more barrels, kegs, casks, or the like can be thoroughly scrubbed on all the outer surfaces and can at the same time be rinsed in the manner of a person shaking a barrel when cleaning the inner side thereof.

It will be obvious that the precise form and arrangements of the parts herein shown are not essential to my improvements, and they may be varied within the limits of mechanical skill without departing from the scope of the present invention.

Having thus described my invention, what I claim is—

1. In a barrel-washing machine, the combination, of a main frame, having guides or ways, a barrel-supporting carriage, sliding pieces in said guides, having sockets in which said carriage is pivotally supported, a crank-shaft adapted to rotate in bearings in said frame, an eccentric on said shaft and connected with said carriage to produce a reciprocatory movement of the same, and bearings on said carriages, rotary brushes in said bearings, and means connected with said brushes for rotating the same, substantially as and for the purposes set forth.

2. In a barrel-washing machine, the combination, of a main frame, a barrel-supporting carriage arranged in said frame, bearings, as $f$ and $f'$, on said carriage, rotary brushes in said bearings, and mechanism connected with said carriage, for producing an oscillatory movement of the carriage and a rotary movement of the brushes, substantially as and for the purposes set forth.

3. In a barrel-washing machine, the combination, of a main frame, a barrel-supporting carriage, guides or ways in which said carriage is arranged, bearings, as $f$ and $f'$, on said carriage, rotary brushes in said bearings, and mechanism connected with said carriage to cause a reciprocatory movement of the carriage and a rotary movement of the brushes, substantially as and for the purposes set forth.

4. In a barrel-supporting machine, the combination, of a main frame, a barrel-supporting carriage, guides or ways on said frame, slides in said guides or ways, said carriage being pivotally connected with said slides, bearings, as $f$ and $f'$, on said carriage, rotary brushes in said bearings, and mechanism connected with said carriage, to cause a reciprocatory and at the same time an oscillatory movement of the carriage, and a rotary movement of the brushes, substantially as and for the purposes set forth.

5. In a barrel-washing machine, the combination, of a main frame, a barrel-supporting carriage arranged in said frame, bearings, as $f$ and $f'$, on said carriage, rotary brushes in said bearings, and mechanism connected with said carriage, for producing an oscillatory movement of the carriage and a rotary movement of the brush-spindles, consisting, essentially, of a crank-shaft, a gear thereon, a miter-gear $c^8$ $c^{10}$, a miter-gear $c^4$ $c^7$, bearings $d'$ and $d^2$ on the carriage-frame, a shaft $d$, gears $d^3$ and $d^4$ on said shaft, and gears $e'$, $e^2$, $e^3$, $e^4$ on the respective brush-spindles and in mesh with said gears $d^3$ and $d^4$, substantially as and for the purposes set forth.

6. In a barrel-washing machine, the combination, of a main frame, a barrel-supporting carriage, guides or ways in which said carriage is arranged, bearings $f$ and $f'$ on said carriage, rotary brushes in said bearings, and mechanism connected with said carriage to cause a reciprocatory movement of the carriage and a rotary movement of the brush-spindles, consisting, essentially, of a crank-shaft, a gear thereon, a miter-gear $c^8$ $c^{10}$, a miter-gear $c^4$ $c^7$, bearings $d'$ and $d^2$ on the carriage-frame, a shaft $d$, gears $d^3$ and $d^4$ on said shaft, and gears $e'$, $e^2$, $e^3$, $e^4$ on the respective brush-spindles, substantially as and for the purposes set forth.

7. In a barrel-washing machine, the combination, of a main frame, a barrel-supporting carriage, guides or ways on said frame, slides in said guides or ways, said carriage being pivotally connected with said slides, bearings $f$ and $f'$ on said carriage, rotary brushes in said bearings, and mechanism connected with said carriage to cause a reciprocatory and at the same time an oscillatory movement of the carriage, and a rotary movement of the brush-spindles, consisting, essentially, of a crank-shaft, a gear thereon, a miter-gear $c^8$ $c^{10}$, a miter-gear $c^4$ $c^7$, bearings $d'$ and $d^2$ on the carriage-frame, a shaft $d$, gears $d^3$ and $d^4$ on said shaft, and gears $e'$, $e^2$, $e^3$, $e^4$ on the respective brush-spindles, substantially as and for the purposes set forth.

8. In a barrel-washing machine, the combination, of a main frame, a barrel-supporting carriage arranged in said frame, a cross-bar, brush-holding standards thereon, having brush-sections, and mechanism connected with said carriage for producing an oscillatory movement of the same, substantially as and for the purposes set forth.

9. In a barrel-washing machine, the combination, of a main frame, a barrel-supporting carriage, guides or ways in which said carriage is arranged, a cross-bar, brush-holding standards thereon, having brush-sections, and mechanism connected with said carriage for producing a reciprocatory movement of the same, substantially as and for the purposes set forth.

10. In a barrel-washing machine, the combination, of a main frame, a barrel-supporting carriage, guides or ways on said frame, slides in said guides or ways, said carriage being pivotally connected with said slides, a cross-bar, brush-holding standards thereon, having brush-sections, and mechanism connected with said carriage to cause a reciprocatory and at the same time an oscillatory movement of the same, substantially as and for the purposes set forth.

11. In a barrel-washing machine, the combination, of a main frame, a barrel-supporting carriage arranged in said frame, bearings, as $f$ and $f'$, on said carriage, rotary brushes in said bearings, a cross-bar $h$, brush-holding standards thereon, having brush-sections $i$, and mechanism connected with said carriage for producing an oscillatory movement of the carriage and a rotary movement of the brushes, substantially as and for the purposes set forth.

12. In a barrel-washing machine, the combination, of a main frame, a barrel-supporting carriage, guides or ways in which said carriage is arranged, bearings, as $f$ and $f'$, on said carriage, rotary brushes in said bearings, a cross-bar $h$, brush-holding standards thereon, having brush-sections $i$, and mechanism connected with said carriage for producing a reciprocatory movement of the same and a rotary movement of the brushes, substantially as and for the purposes set forth.

13. In a barrel-washing machine, the combination, of a main frame, a barrel-supporting carriage, guides or ways on said frame, slides in said guides or ways, said carriage being pivotally connected with said slides, bearings, as $f$ and $f'$, on said carriage, rotary brushes in said bearings, a cross-bar $h$, brush-holding standards thereon, having brush-sections $i$, and mechanism connected with said carriage to cause a reciprocatory and at the same time an oscillatory movement of the carriage, and a rotary movement of the brushes, substantially as and for the purposes set forth.

14. In a barrel-washing machine, the combination, of a main frame, a barrel-supporting carriage arranged in said frame, bearings, as $f$ and $f'$, on said carriage, rotary brushes in said bearings, a cross-bar $h$, brush-holding standards thereon, having brush-sections $i$, and mechanism, connected with said carriage for producing an oscillatory movement of the carriage and a rotary movement of the brush-spindles, consisting, essentially, of a crank-shaft, a gear thereon, a miter-gear $c^8$ $c^{10}$, a miter-gear $c^4$ $c^7$, bearings $d'$ and $d^2$ on the carriage-frame, a shaft $d$, gears $d^3$ and $d^4$ on said shaft, and gears $e'$, $e^2$, $e^3$, $e^4$ on the respective brush-spindles and in mesh with said gears $d^3$ and $d^4$, substantially as and for the purposes set forth.

15. In a barrel-washing machine, the combination, of a main frame, a barrel-supporting carriage, guides or ways in which said carriage is arranged, bearings, as $f$ and $f'$, on said carriage, rotary brushes in said bearings, a cross-bar $h$, brush-holding standards thereon, having brush-sections $i$, and mechanism connected with said carriage for producing a reciprocatory movement of the same and a rotary movement of the brush-spindles, consisting, essentially, of a crank-shaft, a gear thereon, a miter-gear $c^8$ $c^{10}$, a miter-gear $c^4 c^7$, bearings $d'$ and $d^2$ on the carriage-frame, a shaft $d$, gears $d^3$ and $d^4$ on said shaft, and gears $e'$, $e^2$, $e^3$, $e^4$ on the respective brush-spindles and in mesh with said gears $d^3$ and $d^4$, substantially as and for the purposes set forth.

16. In a barrel-washing machine, the combination, of a main frame, a barrel-supporting carriage, guides or ways on said frame, slides in said guides or ways, said carriage being pivotally connected with said slides, bearings, as $f$ and $f'$, on said carriage, rotary brushes in said bearings, a cross-bar $h$, brush-holding standards thereon, having brush-sections $i$, and mechanism connected with said carriage to cause a reciprocatory and at the same time an oscillatory movement of the carriage, and a rotary movement of the brush-spindles, consisting, essentially, of crank-shaft, a gear thereon, a miter-gear $c^8\ c^{10}$, a miter-gear $c^4\ c^7$, bearings $d'$ and $d^2$ on the carriage-frame, a shaft $d$, gears $d^3$ and $d^4$ on said shaft, and gears $e'$, $e^2$, $e^3$, $e^4$ on the respective brush-spindles and in mesh with said gears $d^3$ and $d^4$, substantially as and for the purposes set forth.

17. In a barrel-washing machine, the combination, of a main frame, a barrel-supporting carriage arranged in said frame, mechanism connected with said carriage for producing an oscillatory movement of the same, a reciprocating bar $h$, brush-holding standards thereon, having brush-sections $i$, and means for causing a reciprocatory movement of the bar $h$, substantially as and for the purposes set forth.

18. In a barrel-washing machine, the combination, of a main frame, a barrel-supporting carriage arranged in said frame, mechanism connected with said carriage for producing an oscillatory movement of the same, a reciprocating bar $h$, brush-holding standards thereon, having brush-sections $i$, and means for causing a reciprocatory movement of the bar $h$, consisting, essentially, of a crank-shaft $k$, and eccentrics thereon and connected with said bar, substantially as and for the purposes set forth.

19. In a barrel-washing machine, the combination, of a main frame, a barrel-supporting carriage and means for producing a reciprocatory movement of said carriage, of bearings, as $f$ and $f'$ on said carriage, rotary brushes arranged on spindles in said bearings, a gear mechanism connected with said spindles, and mechanism for operating the same, substantially as and for the purposes set forth.

20. In a barrel-washing machine, the combination, with a barrel-supporting carriage, of rotary brushes, their gear-wheels, means for operating the same, a cross-bar $h$, brush-holding standards thereon, and means for causing a reciprocatory movement of said bar $h$, substantially as and for the purposes set forth.

21. The combination, in a barrel-washing machine, of a main frame, a barrel-supporting carriage, of bearings, as $f$ and $f'$ on said carriage, rotary brushes arranged on spindles in said bearings, and means for operating the same, supporting fingers or lugs $f^2$ on said bearings, for supporting the barrel in the carriage, adjustable fingers or lugs $f^7$, and locking-levers $f^8$, all arranged, substantially as and for the purposes set forth.

22. In a barrel-washing machine, in combination, a main frame, a barrel-supporting carriage in said frame, and means for causing a reciprocatory motion of the same, bearings thereon, a hubbed gear-wheel in each bearing, a spindle $e^5$ in said hubbed gear-wheels, provided with radial brush-arms, and means for rotating said brush-arms, in combination, with a brush-holding standard $h^2$, having the curved part $h^3$, and the ⌴-shaped portions $h^4$, and brush-sections $i$ adjustably arranged in said portions $h^4$, all arranged, substantially as and for the purposes set forth.

In testimony that I claim the invention set forth above I have hereunto set my hand this 10th day of August, 1895.

CHARLES A. JOHNSON.

Witnesses:
FREDK. C. FRAENTZEL,
WM. H. CAMFIELD, Jr.